United States Patent
Volz et al.

[19]

[11] Patent Number: 5,865,090
[45] Date of Patent: Feb. 2, 1999

[54] PISTON PUMP

[75] Inventors: Peter Volz, Darmstadt; Hans-Dieter Reinartz, Frankfurt am Main; Dieter Dinkel, Eppstein/Ts., all of Germany

[73] Assignee: ITT Manufacturing Enterprises, Inc., Wilmington, Del.

[21] Appl. No.: 849,679

[22] PCT Filed: Dec. 15, 1995

[86] PCT No.: PCT/EP95/04977

§ 371 Date: Aug. 21, 1997

§ 102(e) Date: Aug. 21, 1997

[87] PCT Pub. No.: WO96/18816

PCT Pub. Date: Jun. 20, 1996

[30] Foreign Application Priority Data

Dec. 15, 1994 [DE] Germany .......................... 44 44 646.2

[51] Int. Cl.⁶ ........................................................ F16J 1/10
[52] U.S. Cl. ................... 92/129; 92/72; 417/415
[58] Field of Search ..................... 417/415, 273; 92/129, 138, 72

[56] References Cited

FOREIGN PATENT DOCUMENTS

| | | |
|---|---|---|
| 0 354 725 | 2/1990 | European Pat. Off. . |
| 0 414 933 | 3/1991 | European Pat. Off. . |
| 0 436 564 | 7/1991 | European Pat. Off. . |
| 2243137 | 3/1974 | Germany .............................. 417/273 |
| 2333380 | 1/1975 | Germany . |
| 4027794 | 3/1992 | Germany . |
| 4118950 | 2/1993 | Germany .................................. 92/129 |
| 4139781 A | 6/1993 | Germany .............................. 417/273 |
| 4315826 | 11/1994 | Germany .................................. 92/129 |
| 06 093 964 | 4/1994 | Japan . |
| 2 263318 | 7/1993 | United Kingdom . |
| 96/18816 | 6/1996 | WIPO ...................................... 92/129 |

OTHER PUBLICATIONS

Patent Abstracts of Japan, vol. 018, No. 360 (M–1634), Jul. 7, 1994.

German Patent Application No. G 9307692.4 dated May 5, 1994.

*Primary Examiner*—Timothy Thorpe
*Assistant Examiner*—Cheryl J. Tyler
*Attorney, Agent, or Firm*—Thomas N. Twomey; J. Gordon Lewis

[57] ABSTRACT

The present invention relates to a piston pump, in particular to the arrangement of the bearing ring for supporting the pump piston on an eccentric. The pump bearing includes a bearing ring and a plurality of bearing needles. The peripheral surface of the eccentric is radially inwardly offset in relation to the peripheral surface of the shaft. The two stepped transitions provide stop surfaces for the bearing needles. The bearing ring is supported on an inner ring for a main bearing, on the one hand, and, on the other hand, directly or indirectly on the stepped transition between a second area and a third area in a blind-end bore. Further, an auxiliary bearing is provided with a bearing ring which is made of a material inhering a high degree of wear. Testing the electric motor, used to drive the piston pump, before the piston pump is assembled is thereby permitted.

7 Claims, 1 Drawing Sheet

PISTON PUMP

BACKGROUND OF THE INVENTION

The present invention relates to a piston pump with a pump piston which is supported on an eccentric formed on a shaft, including a pump bearing with a bearing ring and bearing needles which is provided between the eccentric and the pump piston, and including at least one further bearing, in which the shaft rotates.

A pump of this type is disclosed in European patent No. 436 564, for example. A bearing including a brearing ring and single bearing needles is provided between the eccentric and the pump piston. To prevent displacement of the bearing needles and the bearing ring in an axial direction, two collars are provided laterally of the eccentric against which the end surfaces of the needles and the ring will bear.

SUMMARY OF THE INVENTION

Therefore, the present invention discloses designing the bearing assembly so that at least one end surface of the bearing ring can be supported on the inner ring of a bearing for the shaft.

It is, further, important that the axial movability of the bearing needles is not provided by collars on the bearing ring but rather by inwardly offsetting the peripheral surface of the eccentric with respect to the peripheral surface of the shaft. The so produced stepped transitions between the shaft and the eccentric are used as axial abutment surface for the bearing needles.

Preferably, the shaft on which the eccentric is provided is supported by bearings on either side of the eccentric. The shaft itself, which is an extension of an armature shaft of an electric motor, may be the freely floating type, that means that the armature-side end of the shaft is not supported by a bearing.

However, the disadvantage of this assembly is that a function check of the electric motor driving the piston pump cannot be made irrespective of the pump, that means prior to the assembly with the pump.

Therefore, the present invention discloses the provision of an auxiliary bearing in the housing of the electric motor driving the piston pump. The auxiliary bearing is provided on the end of the shaft close to the armature. The most simple design of an auxiliary bearing of this type includes a sliding bearing ring made of a material that yields to a great degree of wear. Thus, the shaft is supported by the auxiliary bearing and a main bearing prior to the installation of the electric motor on the pump. This type of bearing is appropriate to check the electric motor for its operability. After the assembly of the electric motor and the pump, the main bearing is accommodated in the pump housing where it can take up the considerably increased forces, which occur during operation of the pump, to direct them into the pump housing. In the initial period of operation, the auxiliary bearing is destroyed by the bearing forces because the material is subject to major wear, as has been explained hereinabove. Ultimately, the effect of the auxiliary bearing is removed, with the result of a freely floating shaft.

DETAILED DESCRIPTION OF THE DRAWINGS

Figure 1:
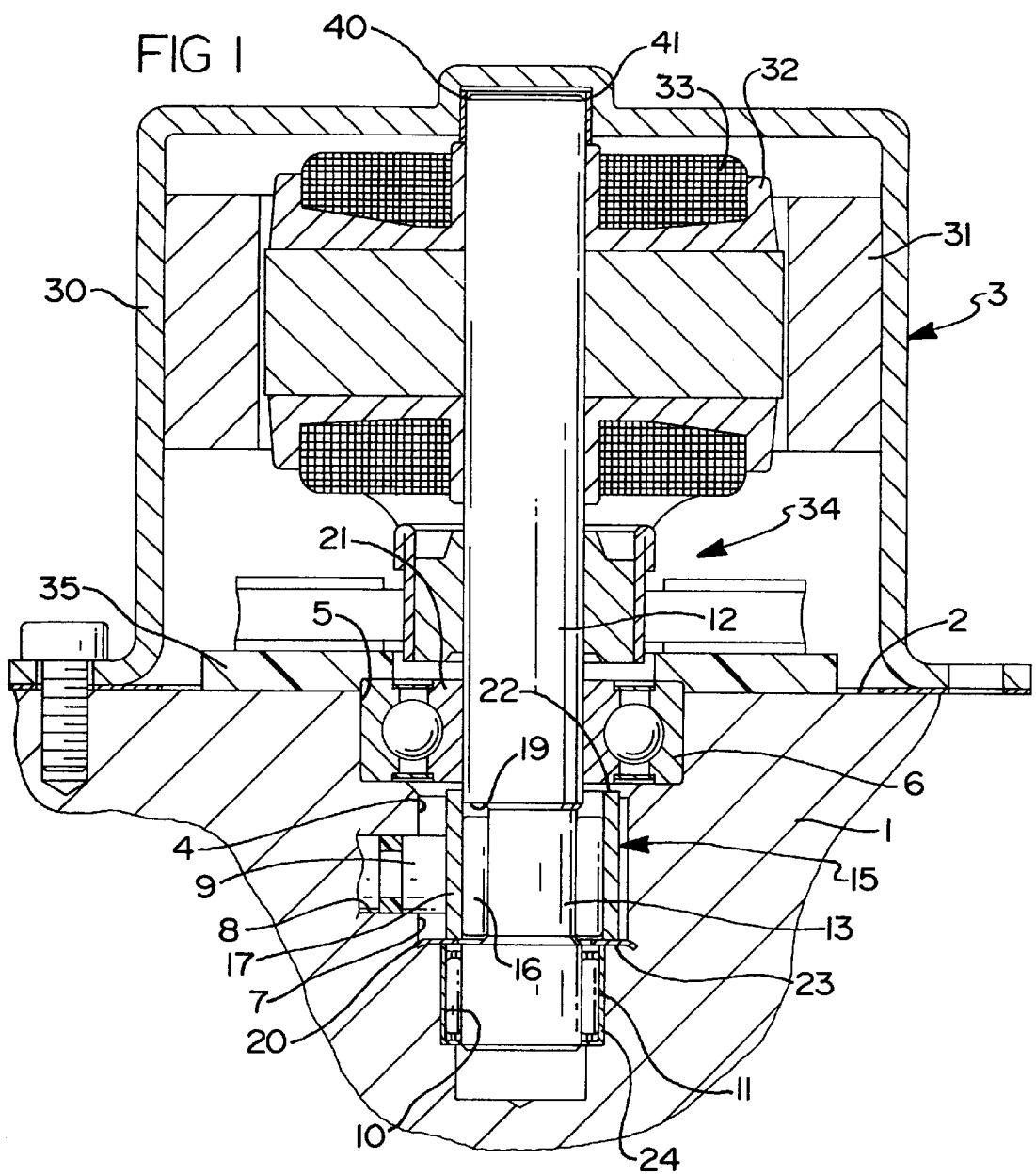
FIG. 1 is a cross-section taken through a motor-and-pump assembly.

FIG. 1 does not show the entire pump but only the area where the eccentric is placed. The pump is accommodated in a housing 1 having a flange surface 2. An electric motor 3 is screwed to surface 2, and pump housing 1 is used as a bearing plate.

Pump housing 1 has a blind-end bore 4 which is stepped several times and opens into the flange surface 2. A first area 5 of the blind-end bore which directly succeeds the flange surface 2 is used to accommodate a main bearing 6.

Following the first area 5 is a second area 7 into which bores 8 open vertically. Pump pistons 9 are guided in bores 8. A third area 10 of stepped bore 4 is used to accommodate an auxiliary bearing 11.

The main bearing 6 and the auxiliary bearing 11 carry a shaft 12 which is configured as an extended armature shaft of the electric motor 3. Proximate the second area 7, the shaft 12 includes an eccentric 13 having a diameter which is smaller than the diameter of the shaft 12. Eccentric 13 is arranged with respect to shaft 12 so that the peripheral surface of the eccentric 13, relative to the peripheral surface of shaft 12, is radially inwardly offset over the entire periphery. Thus, the eccentric 13 is provided as an indentation in relation to the shaft 12.

A pump bearing 15 is provided between the pump piston 9 and the eccentric 13. Pump bearing 15 includes a plurality of rollers or needles 16 which roll directly on the peripheral surface of the eccentric 13. Needles 16 are embraced by a bearing ring 17, and the internal diameter of the bearing ring 17 corresponds to the sum of the diameter of eccentric 13 and two times the diameter of a needle 16.

Because the maximum offsetting of the peripheral surfaces of shaft and eccentric is not in excess of the diameter of a needle 16, the internal peripheral surface of the bearing ring 17 is always spaced from the external peripheral surface of the shaft 12.

The bearing ring 17 does not have any collars towards the in side which prevent movement of the needles 16 in an axial direction. Rather, the shaft 12 extends on both sides of the eccentric 13 beyond the peripheral surface thereof in a radial direction so that stop surfaces 19 or 20 for the needles 16 are provided by the stepped transition between the eccentric 13 and the shaft 12.

Further stop surfaces are provided to prevent movement of the bearing ring 17 in an axial direction.

The stop surfaces are provided by the inner bearing ring 21 of the main bearing 6 in one direction. Bearing ring 21 is seated directly adjacent to the eccentric 13 on the shaft 12 so that the end surfaces 22 of the bearing ring 17 can move into abutment on the inner ring 21.

On the other side of the bearing ring 17, a flat ring 23 is used as an abutment surface. Ring 23 is illustrated in the right-hand half of the drawing, but extends over the entire periphery. Ring 23 abuts on the stepped surface between the second and the third area of the blind-end bore 4. In the absence of ring 23, the end surface of the bearing ring 17 can either move into abutment on the stepped surface itself or on the inwardly bent end of the bearing bushing 24 of the auxiliary bearing 11.

As explained before, the shaft 12 with the eccentric 13 is an ex tended armature shaft of an electric motor 3. The electric motor 3 includes a bowl-shaped housing 30 having permanent magnets 31 secured to its inner cylindrical surface. Mounted on shaft 12 is an armature 32 having windings 33 which are supplied with alternating current by way of a brush collector assembly 34.

This design is typical of a direct-current motor which is used, for example, in control members of automotive vehicles. The open end of bowl 30 is closed by a supporting plate 35. Supporting plate 35 retains the brushes of the brush collector assembly 34 and, over a partial length, the main bearing 6.

Mounted in the bowl bottom of the housing 30 is an auxiliary bearing 40 which carries the end of the shaft 12 close to the armature.

After the assembly of the electric motor 3 and the pump, the auxiliary bearing 40 is of subordinate significance because the forces which act on the shaft 12 are generally taken up by the main bearing 6 and the auxiliary bearing 11 and introduced into the pump housing 1. Rather, the purpose of the auxiliary bearing 40 is to permit testing the electric motor 3 prior to its assembly with the pump. This is because, prior to the assembly, the shaft 12 is supported by the main bearing 6, which is partly mounted in the brush carrier plate 35, and by the auxiliary bearing 40. The mounting support of the main bearing 6 in the brush carrier plate 35 and the design of the auxiliary bearing 40 must be so that the bearing forces can be supported which occur during a test run where no power output of the motor is required.

The auxiliary bearing 40 can be configured as a sliding bearing, for example, and a slide ring 41 which is inserted into an indentation in the bowl bottom embraces the shaft 12. The material, of which the slide ring is made, may be chosen so that it yields to major wear, i.e. low wear resistance. During operation of the electric motor driving the pump, the auxiliary bearing 40 or the slide ring 41 are quickly worn away so that the shaft 12 represents a so-called freely floating shaft which is supported by bearings on the end remote from the armature only.

Figure 2:
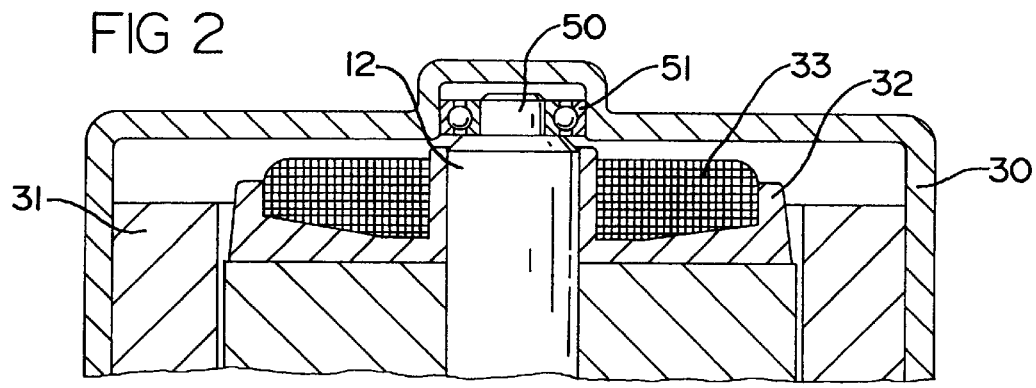
FIG. 2 is an alternative design for supporting the motor shaft in the motor housing.

An alternative of the slide ring of FIG. 1 is the design of the auxiliary bearing of FIG. 2. In FIG. 2, the end of the shaft 12 close to the armature is retained by a ball bearing 51 which is mounted on a pin 50 on the shaft end and arranged in an indentation in the bowl bottom.

We claim:

1. A piston pump including a pump housing having an inlet and an outlet and at least one pump piston which is supported on an eccentric formed on a shaft, wherein a pump bearing comprising a bearing ring and bearing needles is provided between the eccentric and the pump piston, and including at least a second bearing, in which the shaft rotates, said second bearing and said pump bearing are arranged in relation to each other and a first end surface of the bearing ring of the pump bearing is permitted to move into direct abutment on the inner ring of the second bearing.

2. The piston pump as claimed in claim 1, wherein the entire peripheral surface of the eccentric with respect to the peripheral surface of the shaft is radially inwardly offset.

3. The piston pump as claimed in claim 2, wherein the maximum offsetting of the peripheral surface of the eccentric does not exceed the diameter of a bearing needle.

4. The piston pump as claimed in claim 3, wherein a second end surface of the bearing ring is indirectly or directly movable into abutment on a step in the pump housing.

5. The piston pump as claimed in claim 1, wherein the eccentric is arranged on a shaft which is configured as an armature shaft of an electric motor driving the pump.

6. The piston pump as claimed in claim 5, wherein the end of the shaft close to the armature is supported in an auxiliary bearing.

7. The piston pump as claimed in claim 6, wherein the auxiliary bearing includes a bearing ring made of a material with a low wear resistance.

\* \* \* \* \*